(12) United States Patent
Abu-Raqabah et al.

(10) Patent No.: US 6,569,964 B2
(45) Date of Patent: May 27, 2003

(54) ALUMOXANE-ENHANCED, SUPPORTED ZIEGLER-NATTA CATALYSTS, METHODS OF MAKING SAME, PROCESSES OF USING SAME AND POLYMERS PRODUCED THEREFROM

(75) Inventors: Atieh Abu-Raqabah, Riyadh (SA); Abdul Wahab Al-Sádoun, Doha-Qatar (SA); Navin Nallaveerapan, Riyadh (SA)

(73) Assignee: Saudi Basic Industries Corporation, Riyadh (SA)

( * ) Notice: Subject to any disclaimer, the term of this patent is extended or adjusted under 35 U.S.C. 154(b) by 0 days.

(21) Appl. No.: 10/075,413

(22) Filed: Feb. 14, 2002

(65) Prior Publication Data

US 2002/0103311 A1 Aug. 1, 2002

Related U.S. Application Data

(63) Continuation of application No. 09/631,843, filed on Aug. 3, 2000, now abandoned, which is a continuation-in-part of application No. 08/999,049, filed on Dec. 29, 1997, now Pat. No. 6,124,412.

(51) Int. Cl.[7] .......................... C08F 4/654; C08F 4/655; C08F 210/00
(52) U.S. Cl. ................. 526/153; 526/124.3; 526/124.5; 526/165; 526/348; 526/124.9; 502/120; 502/125; 502/132
(58) Field of Search ........................... 526/124.3, 124.5, 526/124.9, 165, 153, 348; 502/120, 125, 132

(56) References Cited

U.S. PATENT DOCUMENTS

| | | | |
|---|---|---|---|
| 4,124,532 A | 11/1978 | Giannini et al. | 252/429 |
| 4,302,566 A | 11/1981 | Karol et al. | 526/125 |
| 4,303,771 A | 12/1981 | Wagner et al. | 526/125 |
| 4,701,432 A | 10/1987 | Welborn, Jr. | 502/113 |
| 5,122,584 A | 6/1992 | Takahashi | 526/125 |
| 5,183,867 A | 2/1993 | Welborn, Jr. | 526/114 |
| 5,442,019 A | 8/1995 | Agapiou et al. | 526/82 |
| 5,672,665 A | 9/1997 | Agapiou et al. | 526/82 |
| 5,747,612 A | 5/1998 | Agapiou et al. | 526/82 |
| 5,753,786 A | 5/1998 | Agapiou et al. | 526/82 |

*Primary Examiner*—Caixia Lu
(74) *Attorney, Agent, or Firm*—Kramer Levin Naftalis & Frankel

(57) ABSTRACT

The invention relates to an improved olefin catalyst, a method of in situ-activated catalyst preparation and a process for the polymerization of olefinic monomers via, for example, a titanium trichloride/magnesium dichloride/tetrahydrofuran reaction product catalyst precursor. The activated catalyst is prepared in situ in a polymerization reactor using an alumoxane based co-catalyst wherein the cumbersome traditional steps of catalyst activation and isolation, prior to polymerization are eliminated. An unexpected advantage of this invention is a significant increase in catalyst productivity while maintaining a relatively constant value of the bulk density of polymeric materials produced while concomitantly producing a polymeric product having a broad molecular weight distribution compared with typical alumoxane-activated metallocene catalysts.

21 Claims, No Drawings

ALUMOXANE-ENHANCED, SUPPORTED ZIEGLER-NATTA CATALYSTS, METHODS OF MAKING SAME, PROCESSES OF USING SAME AND POLYMERS PRODUCED THEREFROM

CROSS-REFERENCE TO RELATED APPLICATIONS

This application is a continuation of U.S. application Ser. No. 09/631,843, filed Aug. 3, 2000 (now abandoned), which was a continuation-in-part application of U.S. application Ser. No. 08/999,049, filed Dec. 29, 1997, now U.S. Pat. No. 6,124,412, incorporated herein by reference.

BACKGROUND OF THE INVENTION

1. Field of the Invention

The invention relates to transition metal-based olefin polymerization Ziegler-Natta catalysts, methods of making the same and methods of using the same.

2. Description of Related Art

Several publications are referenced in this application. These references describe the state of the art to which this invention pertains, and are incorporated herein by reference.

In the field of olefin catalysis, there have been many remarkable discoveries during the last 50 years. In particular, two broad areas of invention stand out. Firstly, in the 1950's, the Ziegler or Ziegler-Natta type catalysts were discovered and exploited for a variety of applications. Today, these catalyst systems, most often referred to as Ziegler-Natta catalysts, are used extensively in commercially important industrial operations. Secondly, and more recently, the discovery of "Metallocene" catalysts having cyclopentadieneyl-modified transition metal complexes has advanced polyolefins research and commercialization.

However, despite the progress in these areas, there are still certain limitations as recognized by those of ordinary skill in the art. For example, traditional Ziegler-Natta catalysts (hereafter referred to as Z-N catalysts) often display limited productivity, where productivity is defined as the efficiency of conversion of monomer to useful polymer per unit of transition metal catalyst utilized.

In contrast, metallocene-based catalysts intrinsically possess high rates of productivity. Typically, however, commercial plants are not able to use such high levels of productivity and refitting such plants would be prohibitively expensive. That is, many commercial plants are not able to use such high levels of productivity because the amount of polymer is in excess of the downstream equipment's ability to process the product. Additionally, the resultant polymers often have undesirable physical characteristics such as very low bulk density and a very narrow molecular weight distribution. These factors, among others, may be seen to negatively impact the commercial utility of these metallocene-based catalyst materials.

To overcome these limitations, the so-called metallocene catalyst systems have often been modified by incorporating the catalysts with non-metallocene catalyst systems thus yielding commercial polymers having an acceptable balance of properties. However, preparing such multi-component catalysts is cumbersome and expensive.

U.S. Pat. Nos. 4,701,423 and 5,183,867 to Welborn, Jr., et al., describe supported olefin polymerization catalysts and processes of using the same. These catalysts may contain at least one metallocene compound of a metal of Group IVB, VB, and VIB of the Periodic Table, a non-metallocene transition metal containing compound of Group IVB, VB, or VIB metal and an alumoxane. The catalysts are reaction products formed in the presence of a support. Welborn describes the utility of the catalysts for the polymerization of olefins, especially ethylene and especially for the copolymerization of ethylene and other mono- and diolefins. More specifically, the Welborn '423 patent describes supported olefin catalyst systems wherein the catalyst components consist of a metallocene, a nonmetallocene transition metal component, an alumoxane and optionally, a cocatalyst system of an organic compound of a metal of Groups I–III of the Periodic Table, particularly, those known in the art as aluminum alkyls. The Welborn '867 Patent also relates to the use of a two component transition metal complex wherein alumoxane and, optionally, aluminum alkyls are used to prepare polymers having multimodal molecular weight distributions (MWD).

U.S. Pat. No. 4,303,771 to Wagner, et al., relates to a catalytic process for preparing ethylene polymers having a density ranging from greater than or equal to 0.94 to less than 0.97 g/cm$^3$ and a melt flow rate of about 22 to about 32 in a low pressure reactor at a productivity of greater than or equal to 50,000 lbs of polymer per pound of titanium with a catalyst formed from selected organoaluminum compounds and a precursor composition being the reaction product of titanium trichloride, magnesium dichloride and an electron donor (ED) compound such as tetrahydrofuran in specific ratios. This precursor is used as a "partially activating" compound before being introduced into a polymerization reactor.

U.S. Pat. No. 4,302,566 to Karol, et al., also relates to the preparation of transition metal catalysts supported on an inert carrier material and reacted with selected organoaluminum compounds. Additionally, the Karol '566 patent relates to specific activation sequences for the catalytic entities.

U.S. Pat. No. 4,124,532 to Giannini, et al., describes the usefulness of incorporating various alkali and alkali earth metal complexes, e.g., magnesium dichloride, into olefinic transition metal polymerization catalysts. These compounds are disclosed as having a positive effect on the activity of the polymerization of ethylene and alpha-olefins while generally being much less active than the corresponding transition metal halides.

In view of the prior art limitations, it would be useful to provide methods of producing homo- and copolyolefin polymers with catalysts which overcome the above-described stated limitations of the conventional catalyst systems. In particular, it would be useful to provide for increased productivity while concomitantly broadening the molecular weight distribution while maintaining relatively consistent values of bulk density. These advantages would be recognizable to those of ordinary skill in the catalyst and polymerization arts as commercially valuable. An improvement in productivity means that less catalyst is more economically consumed resulting in a cost savings in the amount of catalyst used to produce a given quantity of polymer.

Additionally, as with most industrial polymers, there are differences between the desired material properties and those which result from a typical production operation. Accordingly, it would also be desirable to positively affect the productivity of the catalyst while minimizing changes in the bulk density of the materials produced. This is particularly true since bulk density significantly affects the commercial aspects of polymers, e.g., the shipping of and handling of the polymer materials.

Therefore, it would be advantageous to have a catalyst system having a productivity typically higher than traditional Z-N systems, but without the inherent tradeoffs including the narrowing of the molecular weight distribution and the decrease in the bulk density which occur with metallocene catalysts systems. Thus, a second useful advantage in an olefinic catalyst system would be improving the physical properties of the polymers produced (especially a wide molecular weight distribution) while maintaining a constant value for the bulk density. A polyolefin having these characteristics would be more suitable for different kinds of processing operations (e.g., molding) and particularly, injection molding and film fabrications operations. Still another advantage in an olefinic catalyst system would be the significantly increased flexibility in preparing various combinations of cocatalyst systems useful for polymerization of olefins monomers.

OBJECTS OF THE INVENTION

It is an object of the invention to overcome the above-identified deficiencies.

It is another object of the invention to provide a catalyst for use in olefin polymerizations having a useful, improved range of productivity and methods of using the same.

It is a further object of the invention to provide a method of making improved catalysts for use in olefin polymerizations.

It is a still further object of the invention to provide methods of making improved polymer products from olefin polymerizations having improved physical properties including improved molecular weight distributions, single melting point peak, and/or improved bulk density.

The foregoing and other objects and advantages of the invention will be set forth in or apparent from the following description.

SUMMARY OF THE INVENTION

The inventors of the present application have surprisingly and unexpectedly discovered a process for the in-situ preparation of an alumoxane-modified transition metal based catalyst system which when used for the polymerization of olefinic monomers (particularly ethylene, and copolymers with propylene, 1-butene, 1-pentene, 1-hexene, 1-octene and 4-methyl pentene) displays catalytic productivity significantly higher than other similar catalyst systems. According to one preferred embodiment of the invention, the activity or productivity may be increased by a factor of at least 100% compared with other known (comparative) catalyst systems.

The inventors have unexpectedly and surprisingly found that in situ-activation of a Ziegler-Natta-type catalyst precursor with either an alumoxane or an alumoxane combined in specific ratios with conventional aluminum alkyls, which is subsequently completely activated in the polymerization reactor, yields enhanced polymerization productivity. The catalyst systems of the invention also reduce the amount of expensive alumoxane used in the polymerization. This inventive process is useful in the polymerization of olefin monomers, particularly ethylene and other useful comonomers, having a single melting point peak, a useful, broad range of molecular weights, and melt flow rates (MFR's) providing useful polymers having desirable characteristics as recognized and taught by those of ordinary skill in the art.

DESCRIPTION OF THE PREFERRED EMBODIMENTS

One aspect of the invention relates to improved polymerization catalysts. The supported transition metal based catalyst systems of the present invention are preferably obtained by preparing a precursor which is the reaction product of a mixture of at least one transition metal compound, at least one alkali earth halide or alkali metal halide complex and at least one non-transition metal electron donor (preferably, a weakly coordinating electron donor) in an effective amount of a hydrocarbon liquid, while heating said mixture over a temperature range of from about 60° C. to 75° C., while refluxing said mixture under an inert atmosphere to form a catalyst precursor, and depositing the precursor on an inorganic support and pre-activating the precursor with an alumoxane(s) or an alumoxane(s) with aluminum alkyls. Subsequently, the pre-activated catalyst component is fully activated in situ before polymerization using alumoxanes.

Suitable support materials include silica, alumina, silica-alumina compounds and mixtures thereof as known by those skilled in the art. Other suitable support materials may also be employed, for example, finely divided polyethylene, polypropylene or polystyrene and the like.

According to one embodiment, a silica support is used. The silica support is preferably substantially dehydrated to minimize the surface hydroxyl groups and thus make the support inert towards the catalyst precursor. Such treatments as known to those of ordinary skill in the art may be carried out in vacuum or while fluidizing with an inert gas such as nitrogen or argon and the like at a temperature between about 200° C. to 1000° C., preferably, from 400° C. to 600° C. The duration of such thermal treatment may be anywhere from 2 to 16 hours.

To control the catalyst activity and thus the resulting polymer bulk properties, chemical modification of the support material with organomagnesium and/or organoaluminum compounds such as alkyl aluminums or alkyl magnesium may be suitably employed. A ratio of from about 2 to 10 weight percent of these surface-modifying agents can be used. Pretreatment may be carried out at a temperature from 30° C. to 120° C., preferably 40° C. to 60° C., for 2 to 8 hours. Suitable low boiling point hydrocarbon diluents include hexane, heptane, isopentane and the like as a slurry medium to accomplish such treatments.

The inventive catalyst systems contain at least one transition metal. Illustrative but non-limiting examples of useful transition metal compounds include $TiCl_3$, $TiCl_4$, $Ti(OC_2H_5)_3Cl$, $VOCl_3$, $VCl_4$, $ZrCl_4$, $ZrCl_3(OC_2H_5)$ and the like as useful in the various embodiments of the present invention. However, Ti-containing compounds are preferred and titanium trichloride is the most preferred.

Alkali earth or alkali metal halide compounds are used in the catalyst systems as substrates that dilute titanium centers (and hence increase the active centers), stabilize active titanium centers from the deactivation process, and enhance the chain transfer process during polymerization. Magnesium halide is the preferred alkali earth halide. Examples of the magnesium halide compounds useful in the present invention include $MgCl_2$ and $MgBr_2$. $MgCl_2$ is the more preferred compound, especially anhydrous $MgCl_2$. Preferably, approximately 1 to 10 moles of magnesium chloride per mole of the titanium compound are used. Other suitable alkali earth compounds include $Mg(OR)_2$ or $Mg(OH)Cl$, where R is an alkyl group.

The inventive catalyst systems also contain at least one non-transition metal electron donor. Illustrative but non-limiting examples of electron donor compounds, known as "Lewis Bases," include aliphatic and aromatic esters, aliphatic ethers, cyclic ethers, and aliphatic ketones. The preferred compounds include tetrahydrofuran, dioxane, acetone, methyl formate and diethyl ether. The most preferred electron donor compound is tetrahydrofuran. The molar ratio of the electron donor compound to the titanium compound ranges from about 2 to 30 moles, and more preferable from about 5 to 15 moles of the electron donor compound per mole of the titanium compound.

In order to influence the morphology of polymers prepared using embodiments of the present invention, in particular the bulk density of the polymers, the supported catalyst precursors are pre-activated with an alumoxane and/or various bulky aluminum alkyls at an activator to titanium molar ratio of from about 0.1 to about 15, more preferably about 0.1 to 10. Pre-activation is achieved using a hydrocarbon slurry medium typically at temperatures from about 15° C. to 30° C. with continuous mixing followed by drying at temperatures between about 30° C. to 100° C., and preferably about 50° C. to 80° C., to obtain a free-flowing solid. Illustrative but non-limiting examples of the pre-activating agents include diethyl aluminum chloride (DEAC), trihexyl aluminum (TnHAL), trioctyl aluminum (TnOCTAL), methyl aluminoxane (MAO), and mixtures thereof.

Activation of the pre-activated catalyst precursor, prior to polymerization, is accomplished by feeding a slurry of the pre-activated precursor into a suitable reactor under a nitrogen atmosphere, typically in an inert hydrocarbon diluent such as hexane, heptane, isopentane, toluene, mineral oil or other hydrocarbons known to be useful in the field, followed by the addition of an alumoxane-based cocatalyst. A cocatalyst is diluted with from about 2 to 40 weight percent of a hydrocarbon solvent similar to the one used to slurry the preactivated catalyst, and is subsequently added to the reactor as a solution. Preferably, the total molar ratio of aluminum to titanium in the system is 5 to 300, preferably about 100 to about 250, and more preferably 50 to 150 depending on the specific embodiment. Illustrative but non-limiting examples of the cocatalyst systems employed in the present invention include, but are not limited to, physical mixtures of alumoxane including polymeric methyl aluminoxane (MAO), co-polymeric isobutyl methyl aluminoxane (CoMAO), and mixtures of MAO or CoMAO along with conventional trialkyl aluminum compounds, such as triethyl aluminum (TEAL), tri-isobutyl aluminum (TIBA), trimethyl aluminum (TMA), trihexyl aluminum, diethyl aluminum chloride and mixtures thereof, said physical mixtures of alumoxane and trialkyl aluminum compounds comprising 10 to 90 mole percent alumoxane, and preferably 10 to 50 mole percent alumoxane, wherein the mole percent corresponds to the molar ratios of aluminum from each compound.

The polymerizations according to the invention may be conducted in slurry or gas phase, as known to those skilled in the art. These polymerizations may be conducted over a temperature range of 30 to 120° C., and more particularly between 40 and 100° C. According to one preferred embodiment, the polymerization reactor is a gas phase reactor having an internal temperature between 30° C. to 115° C. at a total reactor pressure ranging between 150 to 1000 PSI. The catalysts of the present invention may be supported catalysts, typically using silica or aluminum, wherein the surfaces of these supports may or may not have been suitably modified as known to those of ordinary skill in the related art. Finally, the process of the present invention may be flexibly practiced using a variety of concentrations of each of the components. The polymers produced using the present invention possess a single melting point peak and/or a useful, broad range of molecular weights, molecular weight distributions (MWD) and MFRs.

The polymerization reaction is carried out by introducing olefinic monomer(s), comonomers and hydrogen into a reactor. Preferably, the reaction temperature is between 50° C. to 110° C., most preferably 70° C. to 90° C. Preferably, the total reactor pressure is 5 to 30 bar, more preferably 7 to 20 bar. After polymerization and deactivation of the catalyst, polymer is recovered, washed and dried in a vacuum oven.

An embodiment typical of the present invention will have a productivity of from 125,000 grams or more of polymer produced per gram of titanium in the catalyst. Typically, the molecular weight of a polyethylene homopolymer prepared in accordance with the present invention may vary over a range of from 1,000 to 600,000 grams/mole. The polydisparity index (molecular weight distribution) expressed as Mw/Mn typically varies from 2.5 to 10. The molecular weight and molecular weight distribution are dependent on hydrogen concentration, catalyst systems and the polymerization temperature used.

The polymer density obtained typically varies from about 0.91 $g/cm^3$ to 0.97 $g/cm^3$, depending on the particular embodiment of catalyst, monomer and reaction conditions selected. The polymers produced have a bulk density of from about 0.30 $g/cm^3$ to 0.43 $g/cm^3$ and preferably from 0.37 $g/cm^3$ to 0.42 $g/cm^3$, again, depending on the particular embodiment of supported catalyst, reaction conditions and monomer.

EXAMPLES

The following examples are illustrative of some of the products and methods of making the same falling within the scope of the present invention. They are, of course, not to be considered in any way limitative of the invention. Numerous changes and modifications can be made with respect to the invention.

Example 1

Preparation of the Catalyst A

In an eight liter glass vessel equipped with a mechanical stirrer, 73 g of anhydrous magnesium chloride ($MgCl_2$), 51 g of titanium trichloride ($TiCl_3$) and approximately 2500 g of tetrahydrofuran (THF) were mixed under a dry nitrogen atmosphere. The mixture was then stirred for about 6 hrs at 60–63° C. and 5 psig pressure, cooled to room temperature and transferred to another glass vessel containing an isopentane slurry of substantially dehydrated silica having about 5 weight % of triethyl aluminum. Then, about 500 g of THF were added to the mixture and the system was stirred for 30 minutes at 5 psig and 80° C. to impregnate the resulting $MgCl_2/TiCl_3$/THF complex on silica. The silica impregnated precursor (SIMP) was then dried under vacuum until the THF content reached 10–15 weight %. Next, about 2000 g of isopentane were added to the dried SIMP to form a slurry medium. To this slurry, 255 g of 20 weight % diethyl aluminum chloride in hexane were added under nitrogen and stirred for about 30 minutes, followed by 450 g of 20 weight % tri-n-hexyl aluminum in hexane, stirred for another 30 minutes. The mixture was then dried at about 70° C. for 4 hrs. The partially activated catalyst containing 0.25 mmol titanium per gram catalyst was transferred under nitrogen atmosphere to the reactor prior to activation and the subsequent addition of monomer(s) for polymerization.

Slurry-Phase Ethylene Polymerization

A clean 2 liter stainless steel reactor fitted with a paddle stirrer was baked under nitrogen for about 1 hr at 150° C., then cooled to 64° C. 1.0 liter of dried polymerization grade hexane was added to the reactor followed by 5.0 ml of a 1.0 M (as aluminum) methyl alumoxane solution in toluene. This mixture was then stirred at 200 rpm for 5 minutes. Next, a suspension of 0.287 g of the preactivated catalyst and 1.0 ml of the methyl alumoxane solution in hexane was fed to the reactor. The final aluminum to titanium ratio (Al/Ti) of the whole mixture in the reactor corresponded to 100:1. The reactor was purged twice with hydrogen and then pressurized to 3 bar with hydrogen with simultaneous heating to increase the reactor temperature to 82° C. The homopolymerization of ethylene was then initiated by introducing ethylene into the reactor at a flow rate not exceeding 10 liter/minute. The reactor pressure is maintained at 15 bar with continuous feeding of ethylene into the reactor. The polymerization was continued for 60 minutes while maintaining the temperature at 85° C. After 60 minutes the ethylene supply was discontinued to terminate the reaction. The reactor was then cooled to less than 50° C. and vented, after which the polyethylene slurry was collected, filtered and dried in a vacuum oven.

293 grams of polyethylene were recovered. The polyethylene had a weight average molecular weight of 129000 g/mol, a molecular weight distribution (Mw/Mn) of 3.5, a density of 0.9595 g/cm$^3$, and a bulk density of 0.374 g/cm$^3$.

Example 2A

Comparative

The procedure used for this example was the same as that described in Example 1, except that a total of 3.0 ml of 1.0 molar solution of triethyl aluminum in hexane, corresponding to an Al/Ti ratio of 50:1, were added to the reactor instead of the methyl alumoxane solution.

In the comparative case, 150 grams of polyethylene were recovered having a weight average molecular weight of 151000 g/mol, a molecular weight distribution of 3.3, a density of 0.9627 g/cm$^3$ and a bulk density of 0.416 g/cm$^3$.

Example 2B

Comparative

The procedure used for this example was the same as that described in Example 1 except that a total of 6.0 ml of 1.0 molar solution of triethyl aluminum in hexane, corresponding to an Al/Ti ratio of 100:1, were added to the reactor instead of the methyl alumoxane solution. 139 grams of polyethylene were recovered having a bulk density of 0.400 g/cm$^3$.

Example 3

The same procedure as described in Example 1 was used except that a total of 7.5 ml of (1.0 molar aluminum) of methyl alumoxane solution in toluene, corresponding to an Al/Ti ratio of 125:1 were used. 301 grams of polyethylene were recovered, having a weight average molecular weight of 138000 g/mol, a molecular weight distribution of 3.5, a density of 0.9595 g/cm$^3$ and a bulk density of 0.376 g/cm$^3$.

Example 4

The same procedure as described in Example 1 was used except that a total of 9.0 ml of (1.0 molar aluminum) solution of methyl alumoxane in toluene, corresponding to an Al/Ti ratio of 150:1, were used. 325 grams of polyethylene were recovered having a weight average molecular weight of 115000 g/mol, a molecular weight distribution of 3.1, a density of 0.9610 g/cm$^3$ and a bulk density of 0.366 g/cm$^3$.

Example 5

The same procedure as described in Example 1 was used except that a total of 10.5 ml of (1.0 molar aluminum) solution of methyl alumoxane in toluene, corresponding to an Al/Ti ratio of 175:1, were used. 320 grams of polyethylene were recovered having a weight average molecular weight of 132000 g/mol, a molecular weight distribution of 3.5, a density of 0.9600 g/cm$^3$ and a bulk density of 0.376 g/cm$^3$.

Example 6

The same procedure as described in Example 1 was used except that a total of 15.0 ml of (1.0 molar aluminum) solution of methyl alumoxane in toluene, corresponding to an Al/Ti ratio of 250:1, were used. 300 grams of polyethylene were recovered having a weight average molecular weight of 121000 g/mol, a molecular weight distribution of 3.2, a density of 0.9610 g/cm$^3$ and a bulk density of 0.375 g/cm$^3$.

Example 7

The same procedure as described in Example 1 was used except that a total of 21.0 ml of (1.0 molar aluminum) solution of methyl alumoxane in toluene, corresponding to an Al/Ti ratio of 350:1, were used. 289 grams of polyethylene were recovered having a weight average molecular weight of 122000 g/mol, a molecular weight distribution of 3.1, a density of 0.9625 g/cm$^3$ and a bulk density of 0.346 g/cm$^3$.

Examples 8–19

Use MAO/TEAL Cocatalyst Systems

The procedures used for these examples were the same as that used for Example 1 except that mixtures of solutions of triethyl aluminum in hexane and methyl alumoxane in toluene were used instead of the methyl alumoxane solution. Table I lists the molar ratios of TEAL/MAO as well as the corresponding polymer yields and the properties of the polymers made in such examples.

TABLE I

| Ex. No. | TEAL/ MAO | Co-cat Mixture Qty (ml) | Al/Ti | Yield (g) | Mw g/mol | MWD | Density (g/cm$^3$) | BD. (g/cm$^3$) |
|---|---|---|---|---|---|---|---|---|
| 8  | 50:50 | 4.5  | 75  | 178 | 185000 | 4.0 | — | 0.380 |
| 9  | 50:50 | 6.0  | 100 | 172 | 166000 | 4.5 | — | 0.322 |
| 10 | 50:50 | 9.0  | 150 | 168 | 161000 | 4.1 | — | 0.385 |
| 11 | 50:50 | 12.0 | 200 | 135 | 168000 | 3.4 | — | 0.393 |
| 12 | 30:70 | 4.5  | 75  | 198 | 215000 | 4.0 | — | 0.393 |
| 13 | 30:70 | 6.0  | 100 | 202 | 178000 | 3.5 | — | 0.383 |
| 14 | 30:70 | 9.0  | 150 | 205 | 172000 | 4.2 | — | 0.375 |
| 15 | 30:70 | 12.0 | 200 | 183 | 168000 | 4.4 | — | 0.389 |
| 16 | 10:90 | 6.0  | 100 | 170 | 179000 | 4.0 | — | 0.375 |
| 17 | 10:90 | 9.0  | 150 | 217 | 172000 | 4.4 | — | 0.375 |
| 18 | 10:90 | 12.0 | 200 | 212 | 206000 | 5.0 | — | 0.384 |
| 19 | 10:90 | 15.0 | 250 | 223 | 161000 | 4.0 | — | 0.373 |

Examples 20–23

Use of MAO/TMA Cocatalyst Systems

The same procedures as described in Examples 8–19 were used except that mixtures of solutions of trimethyl aluminum in hexane and methyl alumoxane in toluene were used instead of triethyl aluminum and methyl alumoxane mixtures. Table II lists the molar ratio of TMA/MAO as well as the corresponding polymer yields and the properties of the polymers produced in such examples.

TABLE II

| Ex. No. | TIB/MAO | Co-cat Mixture Qty (ml) | Al/Ti | Yield (g) | Mw | MWD | Den. g/cm$^3$ | BD. g/cm$^3$ |
|---|---|---|---|---|---|---|---|---|
| 20 | 20:80 | 4.5 | 75 | 223 | 170000 | 3.85 | 0.9554 | 0.380 |
| 21 | 20:80 | 6.0 | 100 | 290 | 159000 | 3.4 | 0.9555 | 0.380 |
| 22 | 20:80 | 9.0 | 125 | 296 | 136000 | 3.2 | 0.9555 | 0.366 |
| 23 | 20:80 | 12.0 | 150 | 265 | 142000 | 3.3 | 0.9555 | 0.378 |

Examples 24–26

Use of MAO/TIBA Cocatalyst Systems

The same procedures as described in Examples 8–19 were used, except that mixtures of solutions of tri iso-butyl aluminum (TIBA) in hexane and methyl alumoxane in toluene were used instead of triethyl aluminum and methyl alumoxane mixtures. Table III lists the molar ratio of TIBA/MAO as well as the corresponding polymer yields and the properties of the polymers produced in such examples.

TABLE III

| Ex. No. | TIB/MAO | Co-cat Mixture Qty (ml) | Al/Ti | Yield (g) | Mw | MWD | Den. g/cm$^3$ | BD. g/cm$^3$ |
|---|---|---|---|---|---|---|---|---|
| 24 | 30:70 | 6.0 | 100 | 266 | — | — | — | 0.362 |
| 25 | 30:70 | 9.0 | 150 | 285 | — | — | — | 0.345 |
| 26 | 30:70 | 12.0 | 200 | 265 | — | — | — | 0.325 |

Slurry-Phase Ethylene Copolymerization with 1-Hexene

Examples 27–29

Use of MAO Cocatalyst

A clean 2 liter stainless steel reactor fitted with a paddle stirrer was baked under nitrogen for about 1 hr at about 150° C., then cooled to about 64° C. 1.0 liter of dried polymerization grade hexane was then added to the reactor followed by 9.0 ml of methyl alumoxane solution in toluene. This mixture was then stirred at 200 rpm for 5 minutes. Next, a suspension of 0.287 g of the preactivated catalyst A and 1.5 ml of the methyl alumoxane solution in toluene mixed with specific quantity of 1-hexene was fed to the reactor. The Al/Ti ratio of the whole mixture in the reactor corresponded to 175:1. The reactor was purged twice with hydrogen and then pressurized to 3 bar with hydrogen with simultaneous heating to increase the reactor temperature to 82° C. The polymerization of ethylene was then initiated by introducing ethylene into the reactor at a flow rate not exceeding 10 liter/minute. The reactor pressure was maintained at 15 bar with continuous feeding of ethylene into the reactor. The polymerization was continued for 60 minutes while maintaining the temperature at 85° C. After 60 minutes the ethylene supply was discontinued to terminate the reaction. The reactor was then cooled to less than 50° C. and vented after which the polyethylene slurry was collected, filtered and dried in a vacuum oven. Table IV lists the various comonomer (1-hexene) quantities used in these reactions, the polymer yields, and the physical properties of the polymers produced.

TABLE IV

| Ex. No. | Comonomer Ml | Yield g | BD g/cm$^3$ | Den. g/cm$^3$ | MW g/mol | MWD | Br/ 1000 C | C6 Mol % |
|---|---|---|---|---|---|---|---|---|
| 27 | 25 | 405 | 0.359 | 0.9518 | 114000 | 3.5 | 0.9 | 0.19 |
| 28 | 50 | 446 | 0.324 | 0.9474 | 108000 | 3.8 | 2.0 | 0.39 |
| 29 | 75 | 440 | 0.311 | 0.9450 | 108000 | 3.4 | 2.7 | 0.54 |

Examples 30–32

Use of TEAL Cocatalyst

Comparative

The same procedure as described in Examples 27–29 was used except that 3.0 ml of 1.0M triethyl aluminum in hexane, corresponding to an Al/Ti ratio of 50:1, was used as cocatalyst instead of methyl alumoxane. Table V lists the comonomer quantities used, the corresponding polymer yields and the physical properties of the resulting polymers.

TABLE V

| Ex. No. | Comonomer Ml | Yield g | BD g/cm$^3$ | Den. g/cm$^3$ | Mw g/mol | MWD | Br/ 1000 C | C6 Mol % | Melting Point (°C.) |
|---|---|---|---|---|---|---|---|---|---|
| 30 | 25 | 256 | 0.405 | 0.949 | 142500 | 4.1 | 0.7 | 0.14 | 133.9 |
| 31 | 50 | 233 | 0.396 | 0.9445 | 162000 | 4.0 | 1.1 | 0.21 | 133.1 |
| 32 | 75 | 256 | 0.388 | 0.9415 | 140000 | 3.7 | 1.6 | 0.31 | 130.4 |

Examples 33–35

Use of MAO/TEAL Cocatalyst System

The same procedure as described in Examples 27–29 was used except that 6.0 ml of a 30:70 molar ratio mixture of triethyl aluminum in hexane and methyl alumoxane in toluene, corresponding to an Al/Ti ratio of 100:1, was used as cocatalyst instead of triethyl aluminum. Table VI lists the comonomer quantities used, the corresponding polymer yields and the physical properties of the resulting polymers.

TABLE VI

| Ex. No. | Comonomer Ml | Yield g | BD g/cm$^3$ | Den. g/cm$^3$ | MW g/mol | MWD | Br/ 1000 C | C6 Mol % | Melting Point (°) |
|---|---|---|---|---|---|---|---|---|---|
| 33 | 25 | 322 | 0.370 | 0.9517 | 115000 | 3.5 | 0.8 | 0.15 | 133.9 |
| 34 | 50 | 355 | 0.377 | 0.9484 | 113000 | 3.8 | 1.3 | 0.25 | 132.2 |
| 35 | 75 | 360 | 0.364 | 0.9458 | 105000 | 3.6 | 2.0 | 0.40 | 130.1 |

Examples 36–38

Use of MAO/TMA Cocatalyst System

The same procedure as described in Examples 27–29 was used except that 7.5 ml of a 20:80 molar ratio mixture of trimethyl aluminum in hexane and methyl alumoxane in toluene, corresponding to an Al/Ti ratio of 125:1, was used as cocatalyst instead of the triethyl aluminum/methyl alumoxane mixture. Table VII lists the comonomer quantities used and the physical properties of the resulting polymers.

TABLE VII

| Ex. No. | Comonomer Ml | Yield g | BD g/cm$^3$ | Den. g/cm$^3$ | MW | MWD | Br/ 1000 C | C6 Mol % | Melting Point (°) |
|---|---|---|---|---|---|---|---|---|---|
| 36 | 25 | 333 | 0.373 | 0.9508 | 123000 | 4.6 | 0.8 | 0.15 | 133.8 |
| 37 | 50 | 349 | 0.368 | 0.9478 | 143000 | 4.3 | 1.3 | 0.25 | 132.2 |
| 38 | 75 | 380 | 0.338 | 0.9448 | 123000 | 4.4 | 2.2 | 0.43 | 130.1 |

Slurry-Phase Ethylene Copolymerization with 1-butene

Example 39

Use of MAO Cocatalyst

A clean 2 liter stainless steel reactor fitted with a paddle stirrer was baked under dry nitrogen for 1 hr at about 150° C., then cooled to 64° C. 1.0 liter of dried polymerization grade hexane was then added to the reactor followed by 9.0 ml of methyl alumoxane solution in toluene. This mixture was then stirred at 200 rpm for 5 minutes. Next, a suspension of 0.287 g of the preactivated catalyst A and 1.5 ml of the methyl alumoxane solution in toluene was fed to the reactor. The Al/Ti ratio of the whole mixture in the reactor corresponded to 175:1. The reactor was purged twice with hydrogen and then pressurized to 3 bar with hydrogen with simultaneous heating to increase the reactor temperature to 82° C. After completion of the addition of hydrogen, 20 ml of 1-butene was added to the reactor through a pressure burette. The polymerization of ethylene was then initiated by introducing ethylene into the reactor at a flow rate not exceeding 10 liter/minute. The reactor pressure was maintained at 15 bar with continuous feeding of ethylene into the reactor. The polymerization was continued for 60 minutes while maintaining the temperature at 85° C. After 60 minutes the ethylene supply was discontinued to terminate the reaction. The reactor was then cooled to less than 50° C. and vented after which the polyethylene slurry was collected, filtered and dried in a vacuum oven. 380 grams of polyethylene was recovered having a bulk density of 0.376 g/cm$^3$ and a single melting point of 132.0° C.

Example 40

Use of TEAL Cocatalyst

Comparative

The same procedure as described in Example 39 was used except that 3.0 ml of 1.0 M TEAL solution corresponding to an Al/Ti ratio of 50:1, was used as cocatalyst instead of the triethyl aluminum/methyl alumoxane mixture and 15 ml of 1-butene was added instead of 20 ml. 315 grams of polyethylene were recovered having a bulk density of 0.399 g/cm$^3$.

Example 41

Use of MAO/TEAL Cocatalyst System

The same procedure as described in Example 39 was used except that 6.0 ml of a 30:70 molar ratio mixture of triethyl aluminum in hexane and methyl alumoxane in toluene corresponding to an Al/Ti ratio of 100:1, was used as cocatalyst instead of triethyl aluminum. 310 grams of polyethylene were recovered having a bulk density of 0.392 g/cm$^3$ and a single melting point of 132.0° C.

Example 42

Use of MAO/TMA Cocatalyst System

The same procedure as described in Example 39 was used except that 7.5 ml of a 20:80 molar ratio mixture of trimethyl aluminum in hexane and methyl alumoxane in toluene corresponding to an Al/Ti ratio of 125:1, was used as cocatalyst instead of triethyl aluminum. 430 grams of polyethylene were recovered having a bulk density of 0.369 g/cm$^3$ and a single melting point of 132.0° C.

Example 43

Use of MAO/TIBA Cocatalyst System

The same procedures as described in Example 39 were used except that 9.0 ml of 30:70 molar ratio mixture of tri-iso-butyl aluminum in hexane and methyl alumoxane in toluene, corresponding to an Al/Ti ratio of 150:1 were used as cocatalyst instead of triethyl aluminum. 341 grams of polyethylene were recovered having a bulk density of 0.383 g/cm$^3$.

Example 44

Ethylene Homopolymerization

The catalyst was prepared following the same procedure described in Example 1 except using silica having a low average particle size of about 20 microns. Ethylene homopolymerization was conducted following the procedure also described in Example 1 except that 0.1 grams of catalyst and a total amount of 2 mmol of modified methylalumoxane (MMAO) cocatalyst were used. 600 grams of polyethylene were recovered corresponding to a catalyst productivity of 6,000 g PE/g catalyst.hr. The polymer produced had a single melting point at 141.5° C., an average molecular weight (MW) of 171,000 g/mol, a molecular weight distribution of 4.3, a density of 0.9615 g/cm$^3$, and a bulk density of 0.30 g/cm$^3$.

Example 45

Ethylene/1-Butene Copolymerization

The same procedure as described in Example 44 was used except using 0.02 grams of the catalyst, 1.2 mmol of MMAO cocatalyst and 10 ml 1-butene copolymer. 260 grams of polyethylene were recovered corresponding to a catalyst productivity of 13,000 g PE/g catalyst.hr. The copolymer produced had a single melting point at 138.9° C., an average molecular weight (MW) of 150,000 g/mol, a molecular weight distribution of 5.0, a density of 0.9560 g/cm$^3$, and a bulk density of 0.24 g/cm$^3$.

Related examples, namely Examples 1–28, are set forth in parent application U.S. application Ser. No. 08/999,049, filed Dec. 29, 1997, now U.S. Pat. No. 6,124,412, incorporated herein by reference.

The above description of the invention is intended to be illustrative and not limiting. Various changes or modifications in the embodiments described may occur to those skilled in the art. These can be made without departing from the spirit or scope of the invention.

We claim:

1. A process comprising the steps of:
   (a) preparing a catalyst precursor by reacting a mixture of at least one transition metal compound, at least one electron donor and at least one alkali earth halide or alkali metal halide complex in an effective amount of a hydrocarbon liquid, while heating said mixture over a temperature range of from about 60° C. to 75° C., refluxing said mixture under an inert atmosphere to form said catalyst precursor;
   (b) partially activating said catalyst precursor with an effective amount of an alumoxane or a physical mixture comprising an alumoxane and an organoaluminum compound selected from the group consisting of triethyl aluminum, diethyl aluminum chloride, tri-n-hexel aluminum and mixtures thereof;
   (c) adding a slurry of a support material into the reactor and forming an impregnated, supported, partially activated catalyst precursor;
   (d) recovering said impregnated, supported, partially activated catalyst precursor;
   (e) adding said impregnated supported, partially activated catalyst precursor to a polymerization reactor containing a solution comprising a cocatalyst selected from the group consisting of
      (i) an alumoxane and
      (ii) a mixture of an alumoxane and an organoaluminum compound selected from the group consisting of trihexyl aluminum, triethyl aluminum, trimethyl aluminum, tri-isobutyl aluminum, diethyl aluminum chloride and mixtures thereof;
   (f) introducing olefinic monomers into said reactor and polymerizing said monomers over a polymerization temperature range of from about 30° C. to about 120° C. to form a polymeric product having a single melting point peak; and
   (g) recovering said polymeric product.

2. The process according to claim 1, wherein said olefinic monomers are selected from the group consisting of ethylene, propylene, 1-butene, 1-pentene, 1-hexene, 1-octene, 4-methyl, 1-pentene and mixtures thereof.

3. The process according to claim 2, wherein said reactor is a gas-phase reactor having an internal temperature between 30° C. and 115° C. at a total reactor pressure ranging between 150 to 1000 PSI.

4. The process according to claim 2, wherein the polymerization temperature ranges between 50° C. and 90° C.

5. The process according to claim 2, wherein said reactor is a slurry-phase type reactor operating over a temperature from about 40° C. to about 100° C.

6. The process according to claim 2, wherein the aluminum to titanium molar ratio of the catalyst system is from about 50:1 to about 350:1.

7. The process according to claim 2, wherein the aluminum to titanium molar ratio of the catalyst system is from about 100:1 to about 250:1.

8. The process according to claim 2, wherein the cocatalyst is an alumoxane.

9. The process according to claim 2, wherein the cocatalyst is methyl alumoxane.

10. The process according to claim 2, wherein the cocatalyst is a physical mixture of an alumoxane and a trialkyl aluminum compound selected from the group consisting of trihexyl aluminum, diethyl aluminum chloride, triethyl aluminum and mixtures thereof, said physical mixture comprising 10 to 90 mole percentage (as aluminum) alumoxane.

11. The process of claim 1, wherein said at least one transition metal compound comprises titanium trichloride.

12. The process of claim 1, wherein said alkali earth halide or alkali metal halide complex comprises magnesium dichloride.

13. A process comprising:
   (a) preparing a catalyst precursor by reacting a mixture of at least one transition metal compound, at least one electron donor and at least one alkali earth halide or alkali metal halide complex in an effective amount of a hydrocarbon liquid to form said catalyst precursor;
   (b) partially activating said catalyst precursor with an effective amount of an alumoxane or a physical mixture comprising an alumoxane and an organoaluminum compound;
   (c) adding a slurry of a support material into the reactor and forming an impregnated, supported, partially activated catalyst precursor;
   (d) adding said impregnated supported, partially activated catalyst precursor to a polymerization reactor containing a solution comprising a cocatalyst selected from the group consisting of
      (i) an alumoxane and
      (ii) a physical mixture of an alumoxane and an organoaluminum compound; and
   (e) introducing olefinic monomers into said reactor and polymerizing said monomers over a polymerization temperature range of from about 30° C. to about 120° C. to form a polymeric product having a single melting point peak.

14. The process of claim 1, wherein the alumoxane of step (b) comprises methyl alumoxane.

15. The process of claim 1, wherein the alumoxane of step (e) comprises methyl alumoxane.

16. The process of claim 13, wherein the alumoxane of step (b) comprises methyl alumoxane.

17. The process of claim 13, wherein the alumoxane of step (e) comprises methyl alumoxane.

18. The process of claim 13, wherein said olefinic monomers are selected from the group consisting of ethylene, propylene, 1-butene, 1-pentene, 1-hexene, 1-octene, 4-methyl, 1-pentene and mixtures thereof.

19. The process of claim 13, wherein the polymerization temperature ranges between 50° C. and 90° C.

20. The process of claim 13, wherein said alkali earth halide or alkali metal halide complex comprises magnesium dichloride.

21. The process of claim 13, wherein the cocatalyst is a physical mixture of an alumoxane and a trialkyl aluminum compound selected from the group consisting of trihexyl aluminum, diethyl aluminum chloride, triethyl aluminum and mixtures thereof, said physical mixture comprising from 50 mole percent alumoxane to 10 mole percent alumoxane solution of an alumoxane and an aluminum alkyl, wherein mole percent corresponds to the molar ratios of aluminum from each compound.

* * * * *